(12) United States Patent
Godfrey et al.

(10) Patent No.: US 8,055,449 B2
(45) Date of Patent: Nov. 8, 2011

(54) DETERMINING FAULT TRANSMISSIVITY IN A SUBTERRANEAN RESERVOIR

(75) Inventors: Robert Godfrey, Ashurstwood East Grinstead (GB); Jean-Michel Gehenn, Alsace (FR); Thibaut Cheret, Reading (GB); Richard Dolman, Banstead (GB); Michael Nickel, Stavanger (NO); Lars Sonneland, Tananger (NO)

(73) Assignee: WesternGeco L.L.C., Houston, TX (US)

( * ) Notice: Subject to any disclaimer, the term of this patent is extended or adjusted under 35 U.S.C. 154(b) by 589 days.

(21) Appl. No.: 12/193,029

(22) Filed: Aug. 17, 2008

(65) Prior Publication Data
US 2009/0093965 A1     Apr. 9, 2009

Related U.S. Application Data

(60) Provisional application No. 60/978,269, filed on Oct. 8, 2007.

(51) Int. Cl.
*G01V 1/28* (2006.01)
(52) U.S. Cl. ............... 702/14; 702/11; 702/16; 703/10; 367/72; 367/73; 367/38
(58) Field of Classification Search ............ 702/11, 702/14, 16; 703/10; 367/72, 73, 38
See application file for complete search history.

(56) References Cited

U.S. PATENT DOCUMENTS

| 7,248,539 | B2 | 7/2007 | Borgos et al. |
| 7,254,091 | B1 | 8/2007 | Gunning et al. |
| 2006/0041409 | A1 | 2/2006 | Strebelle et al. |
| 2009/0319243 | A1* | 12/2009 | Suarez-Rivera et al. ........ 703/10 |

FOREIGN PATENT DOCUMENTS

GB     2375448 A     11/2002

OTHER PUBLICATIONS

Pendrel, Estimation and Interpretation of P and S Impedance Volumes from Siultaneous Inversion of P-Wave Offset, SEG Expanded Abstracts, 2000, vol. 19, No. 146.
Connolly, Elastic Impedance, The Leading Edge, Apr. 1999, vol. 18, pp. 438-452.
PCT Search Report, dated Jul. 30, 2010, Application No. PCT/US2008/074514.

* cited by examiner

*Primary Examiner* — Drew A Dunn
*Assistant Examiner* — Hien Vo

(57) ABSTRACT

To determine fault transmissivity in a subterranean reservoir, fault structures in the subterranean reservoir are identified, and elastic impedance data is computed from well log data and seismic data. Normalization parameters that have a predetermined orientation with respect to the identified fault structures are computed, and elastic impedance flux values are normalized with respect to the normalization parameters, where the normalized elastic impedance flux values are indicative of transmissivities of fault structures in the subterranean structure.

20 Claims, 3 Drawing Sheets

DETERMINING FAULT TRANSMISSIVITY IN A SUBTERRANEAN RESERVOIR

CROSS-REFERENCE TO RELATED APPLICATION

This application claims the benefit under 35 U.S.C. §119(e) to U.S. Provisional Patent Application Ser. No. 60/978,269, entitled "DETERMINING FAULT TRANSMISSIVITY IN A SUBTERRANEAN RESERVOIR TECHNICAL FIELD", which was filed on Oct. 8, 2007, and is hereby incorporated by reference in its entirety.

TECHNICAL FIELD

The invention relates generally to determining fault transmissivity in a subterranean reservoir.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations on an earth surface, sea floor or at a sea surface (or in a wellbore), with the seismic sources activated to generate seismic waves directed into a subterranean structure. Examples of seismic sources include air guns, vibrators, explosives, or other sources that generate seismic waves.

The seismic waves generated by a seismic source travel into the subterranean structure, with a portion of the seismic waves reflected back to the surface (earth surface, sea floor, sea surface, or wellbore surface) for receipt by seismic sensors (e.g., geophones). These seismic sensors produce signals that represent detected seismic waves. Data from the seismic sensors is processed to yield information about the content and characteristic of the subterranean structure (e.g., reservoir).

Based on the seismic survey data, an image of the reservoir can be generated. Using such image, geologists can map faults by observing where a displacement between reflection layers has taken place. A fault in the reservoir refers to a fracture in a portion of the reservoir that shows evidence of relative movement. Certain faults can present barriers to migration of fluids (e.g., hydrocarbon fluids, etc.) within the reservoir. In some cases, the mapping of faults within a reservoir is performed manually by geologists. Because there can be huge amounts of seismic survey data, such manual fault interpretation is a tedious and difficult task.

Automated fault extraction algorithms have also been developed for extracting faults from an image of a subterranean structure. However, although faults can be detected, it is desirable to further characterize the faults to provide additional useful information.

SUMMARY

In general, according to an embodiment, a method of determining fault transmissivity in a subterranean reservoir includes identifying fault structures in the subterranean reservoir. In addition, normalization parameters (e.g., normalization variograms) are computed that have a predetermined orientation with respect to the identified fault structures. Elastic impedance flux values are determined from elastic impedance data, and the elastic impedance flux values are normalized with respect to the normalization parameters, where the normalized elastic impedance flux values are indicative of transmissivities of faults in the subterranean reservoir.

Other or alternative features will become apparent from the following description, from the drawings, and from the claims.

DETAILED DESCRIPTION

Figure 1:
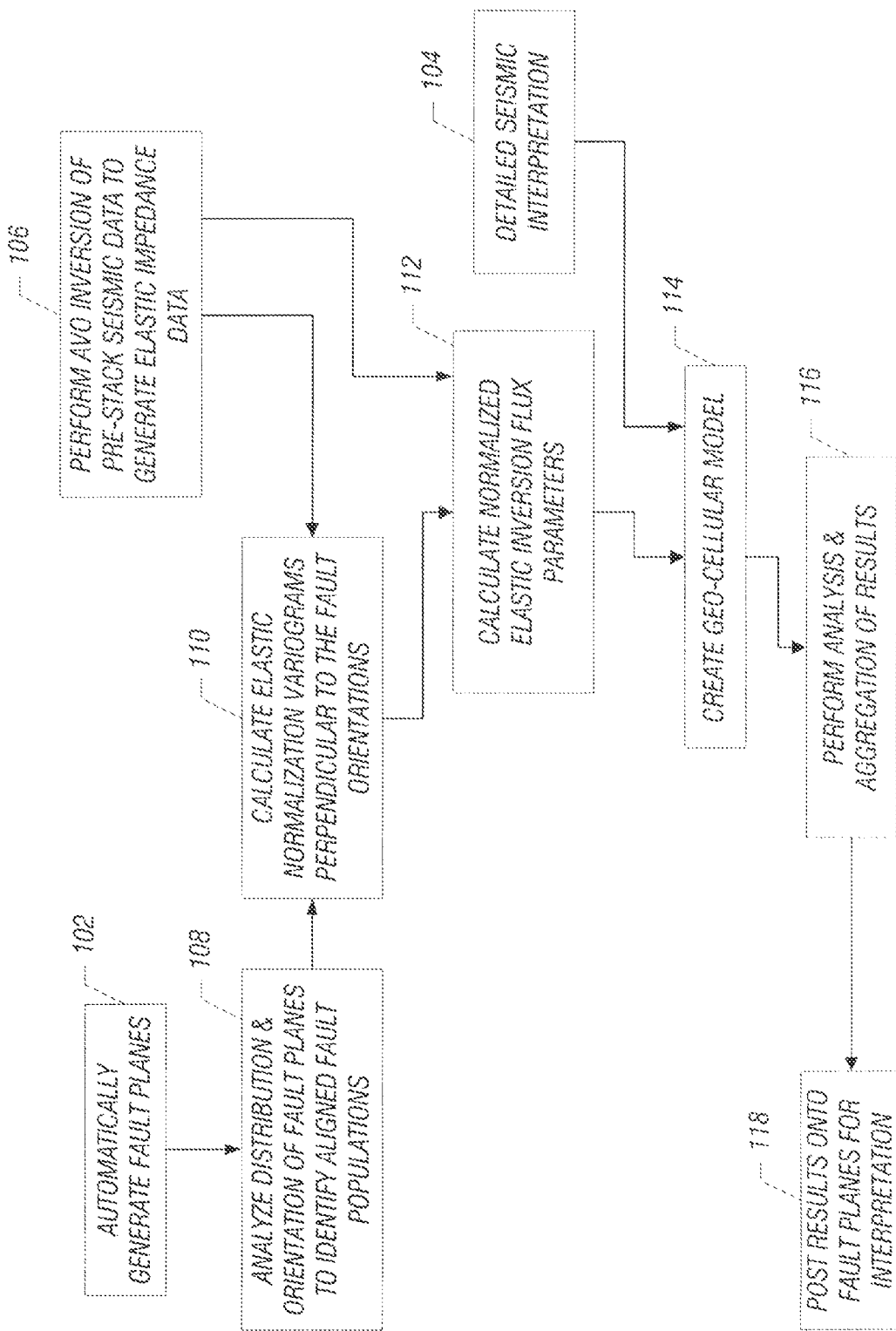
FIG. 1 is a flow diagram of a process of determining transmissivity of faults in accordance with an embodiment.

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a technique is provided to determine transmissivity of fault structures in a subterranean reservoir to identify barriers to migration of fluids, such as hydrocarbon fluids. The technique according to some embodiments uses a methodology in which seismic data is evaluated geostatistically to quantitatively infer the sealing potential of discrete faults within a reservoir. The determination of the transmissivity of fault structures within a reservoir can also aid in understanding compartmentalization of fault reservoirs.

In general, the technique according to some embodiments involves identifying fault structures within a reservoir, such as by using automated techniques (e.g., an ant-tracking algorithm as described in GB 2,375,448, entitled "Extracting Features from an Image by Automatic Selection of Pixels Associated with a Desired Feature," published Nov. 13, 2002, which is hereby incorporated by reference). Basically, an automated fault structure identification algorithm uses a pattern recognition system to automatically interpret fault systems that are present in and near a reservoir. With the ant-tracking algorithm, armies of virtual ants are sent scurrying through the image of the reservoir. The paths of the ants are tracked and compiled to reveal any disturbance in the data. Fault patches interpreted by the ant-tracking algorithm is output and analysis and filtering tools can then be applied to allow main bounding faults to be extracted according to their distribution, orientation, and aerial extent.

In addition, elastic impedance data is computed from well logging data and seismic data. Well logging data refers to data relating to characteristics of a reservoir based on well logging conducted using logging tool(s) deployed in one or more wellbores that extend through the reservoir. Seismic data refers to data collected by seismic receivers located at the surface, where the seismic receivers receive acoustic waves reflected from subterranean reflectors in the reservoir that are responsive to acoustic signals produced by seismic sources. Seismic receivers located at the surface refer to seismic receivers positioned on a land surface, on a sea floor, towed in a body of water, or located inside a wellbore.

Elastic impedance refers to an elastic property for acoustic rays with a constant propagation angle that can be used in a similar way as acoustic impedance for normal incidence acoustic rays. Elastic impedance can be a generalization of acoustic impedance for variable incidence angles. Elastic impedance provides a framework to calibrate and invert non-zero-offset seismic data just as acoustic impedance does for zero-offset seismic data. Examples of elastic impedances include Vp/Vs, Poisson's ratio, acoustic impedance, shear wave impedance, and density.

According to the fault structure data, elastic normalization variograms are calculated. An elastic normalization variogram represents correlation between pairs of seismic samples at multiple offsets for layers of the reservoir. The normalization variograms allow the algorithm according to some embodiments to detect variance in the layers of the reservoir. This variance can be used to detect that a layer may normally exhibit large differences between seismic samples, such that a relatively large absolute difference in elastic impedance values may or may not be significant. Such a relatively large absolute difference of elastic impedance values is normalized with respect to the normalization variograms to allow for more accurate characterization of fault structures.

The normalization variograms constitute one type of normalization parameters that are used to normalize elastic impedance flux values (or elastic impedance differences). In other embodiments, other types of normalization parameters can be used.

Impedance flux of elastic properties (difference between elastic impedance properties, e.g., acoustic impedance, shear wave impedance, density, etc.) within a particular layer of a reservoir) is computed to give an indication of fault sealing capacity of the fault structures within a reservoir. The computed impedance flux is perpendicular to fault surfaces to give an indication of the fault sealing capacity. High flux is representative of flow barriers, whereas low flux is representative of conduits for fluid flow. In some examples, acoustic impedance can be used as the elastic impedance to determine the impedance flux. However, in general, any elastic property (acoustic, shear, density) or linear/non-linear combination (Vp/Vs, Poisson's ratio) can be used to determine the impedance flux. As noted above, the computed impedance flux is normalized with normalization variograms (or other normalization parameters) to provide normalized flux values to provide for more accurate characterization.

FIG. 1 illustrates a general flow for determining transmissivity of fault structures in a reservoir according to an embodiment. Unless otherwise noted, the tasks of the flow for determining transmissivity of fault structures can be performed by software executable on a computer. Fault structures (e.g., fault planes) are automatically generated (at 102) using post-stack seismic data, such as by using an ant-tracking algorithm. The ant-tracking algorithm can be executed on a seismic cube produced by typical data processing of seismic data. The output of the ant-tracking algorithm is an ant-tracker cube that provides information regarding distribution and orientation of fault planes in a reservoir.

Based on the fault planes identified at 102, the distribution and orientation of fault planes are analyzed (at 108) to identify aligned fault populations. These aligned fault planes are used in calculating (at 110) elastic normalization variograms. Another input to the calculation of the normalization variograms is elastic impedance data calculated at 106 (discussed further below). The calculated elastic normalization variograms are perpendicular to the fault orientations identified at 108. A normalization variogram contains normalization values that are based on comparing values of seismic samples that are N apart, where N can be 1, 2, 3, and so forth. A variogram includes differences between seismic samples at multiple N offsets.

FIG. 1 also depicts that detailed seismic interpretation is performed (at 104), where the seismic interpretation can be interpretation by humans to paint surfaces onto the seismic image based on visual recognition. Also, AVO (amplitude variation with offset) inversion of pre-stack seismic data is performed (at 106) to generate elastic impedance volumes by combining well log impedance (produced by well logging) with pre-stack amplitudes extracted from seismic data (produced by seismic surveying). Multiple elastic impedance volumes are generated from the AVO inversion, where the elastic impedance volumes can include a volume containing Vp/Vs data, a volume containing Poisson's ratio data, and a volume containing density data, as examples. Calculating flux on an elastic property from AVO inversion has the following benefits over calculating flux from seismic data directly: the deconvolution implicit in the inversion removes errors associated with thin bed tuning from the flux calculation; and the resulting flux can be directly related to changes in rock properties.

Based on the calculated elastic normalization variograms and the elastic impedance volumes, normalized elastic flux parameters are calculated (at 112). The normalized elastic flux parameters are calculated across the identified fault planes. The following effects are accommodated to produce optimum flux estimation: fault throw, compaction effects, and poor seismic imaging smearing energy across faults or fault zones. As geological layers flex away from a fault plane, the "apparent" throw can vary as a function of the seismic sample separation spacing from the fault plane. This flexure can be accommodated in computing the flux according to an embodiment. Such an approach allows for seismic samples to be compared to the appropriate depositionally adjacent seismic sample from the same layer across a fault. To calculate the orientation of the maximum throw, and the amplitude of the throw as a function of sample separation for the whole cube, a non-rigid matching (NRM) algorithm can be applied. One example of the NRM algorithm is described in U.S. Pat. No. 7,248,539, which is incorporated herein by reference, which describes an automated fault detection, extrema detection, and classification tool. In other implementations, other types of non-rigid matching algorithms can be used.

Once the orientation and amplitude of the throw as a function of sample separation is determined, the ant-tracker cube can be then used as a mask to identify the faults to use for further analysis.

To avoid energy from poorly imaged faults adversely impacting the quality and significance of the derived flux, the flux can be calculated using increasing sample separation. The quality of the fault imaging, and hence the optimum separation for flux calculation, can be derived from inspection of the seismic data or from an analysis of the normalized flux as a function of separation for each fault (to identify the separation at which the normalized flux becomes stable). Thus, instead of performing analysis of seismic samples that are adjacent to each other, the analysis can be based on seismic samples that are at other offsets from each other. The idea here is to avoid using data that is contaminated by seismic imaging smearing energy, which can occur due to displacements associated with faults.

If the throw across a fault is significant, apparent spatial variations in acoustic rock properties may be caused by differential compaction across the fault. This is referred to as the compaction effect. Basically, a deeper geological structure is subject to more compaction than a shallower geological structure. The presence of a fault within a geological layer can cause one part of the geological layer to be at a deeper depth (and subject to more compaction) than another part of the geological layer. The differential compaction across the fault can be identified from analysis of a combination of available well log data and the resulting low frequency models from seismic inversion. The differential compaction data can be included in the flux calculation.

Flux normalization is undertaken using the appropriate sample distance from the normalization variogram orientated in the appropriate direction. Flux normalization allows the relative potential transmissivity of faults to be ranked regardless of the fault orientation, compaction effect, the quality of its imaging, or the throw across the fault. In other words, fault throw, compaction effects, and image quality problems are accommodated by performing flux normalization.

For a given geological layer, normalized flux can be expressed as:

$$\partial EI_{xyz\phi\delta} = \left( \frac{\left( EI_{(x+\partial\cos\phi/2),(y+\partial\sin\phi/2),(z-t/2)} - \right)}{EI_{(x-\partial\cos\phi/2),(y-\partial\sin\phi/2),(z+t/2)} * C_t} \right)^2}{2 * \gamma_{\phi\delta}} \right)$$

where $\partial EI_{xyz\phi\delta}$ is the elastic property flux (e.g., acoustic impedances, Poisson's ratio, density, etc.) for all the samples passed by the ant-tracker masking cube, as a function of spatial location x, y, z, orientation φ (perpendicular to the local fault plane identified from ant tracking), and separation δ between seismic samples; $C_t$ is the compaction correction (representing the compaction effect) as a function of the throw t (derived using an NRM algorithm), which is itself a function of the location, x, y, z, orientation φ, and separation δ; and $\gamma_{\phi\delta}$ is the moment of inertia (normalization variogram) as a function of orientation φ, and separation δ, for all the samples identified by the reciprocal of the ant-tracker cube mask (i.e., excluding the property changes across the identified faults, which are potentially anomalous).

The numerator in the equation above represents an elastic impedance flux (difference between elastic impedance values), and the denominator in the equation above represents a normalization variogram. By dividing the elastic impedance flux by the normalization variogram, normalized flux is obtained.

Also, a geocellular model is created (at 114), where the geocellular model includes a volume of cells, where each cell can have any arbitrary geometric shape. The output of the ant-tracking algorithm is used to create the three-dimensional grid of cells in the geocellular model. Each cell in the geocellular model can be populated with a normalized flux value calculated at 112, such as acoustic impedance, Poisson's ratio, or density.

Next, an analysis and geologically consistent aggregation of results is performed (at 116). The average flux over individual lithological zones (layers) and entire faults is calculated to identify subtle and lithologically varying change. The reservoir is divided into different layers, with the flux values of cells within the layers averaged. This allows for the distinction between noise and actual geologic change. The elastic inversion flux parameters are then posted onto the fault planes for visualization and interpretation (at 118).

To increase the significance of results where the magnitude of the normalized flux is small and/or highly spatially variable along a fault, the values can be averaged or aggregated across the fault plane to increase the robustness of the result, and aid in identification of potentially impermeable faults.

Figure 2:
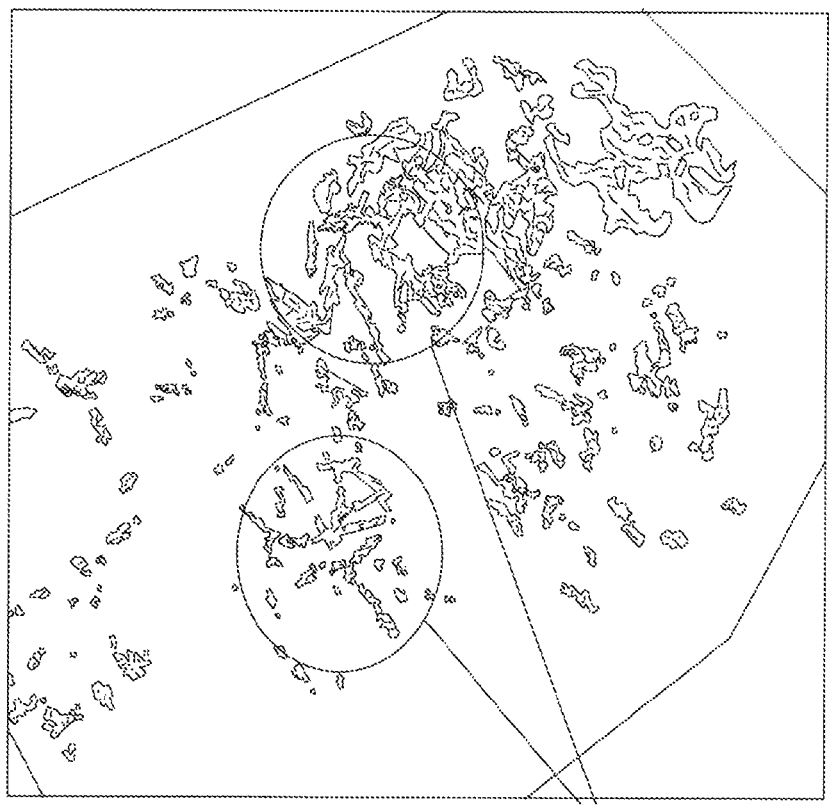
FIG. 2 illustrates low acoustic impedance change across fault structures that reveals conduits favoring fluid production, based on computations performed according to some embodiments.

FIG. 2 illustrates an example output produced by a technique according to some embodiments, where FIG. 2 shows low normalized impedance flux values across fault structures to reveal conduits favoring production. Representations 200 of fault structures are provided in FIG. 2, with the representations 200 assigned some visual indicator (e.g., a first color) to indicate low normalized elastic impedance flux values.

Figure 3:
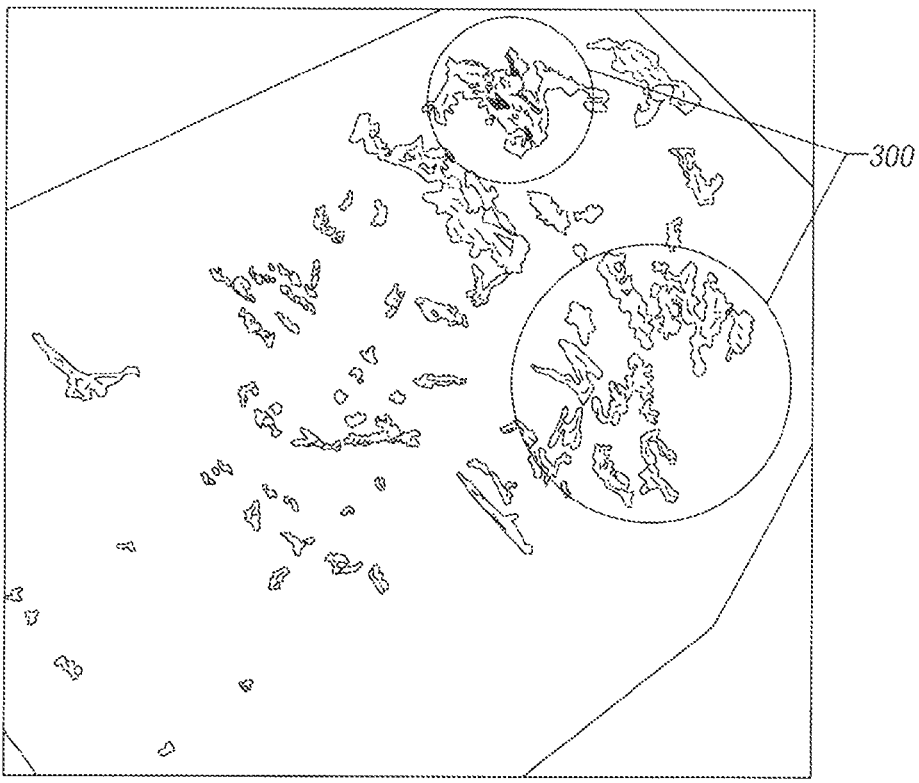
FIG. 3 illustrates high acoustic impedance change across fault structures in a subterranean structure that reveals flow barriers, based on computations according to some embodiments.

On the other hand, FIG. 3 shows another example output that depicts high normalized impedance flux values across fault structures to reveal flow barriers. Such fault structures are indicated with representations 300, which can be assigned another visual indicator (e.g., second color) to indicate high normalized elastic impedance flux values.

Figure 4:
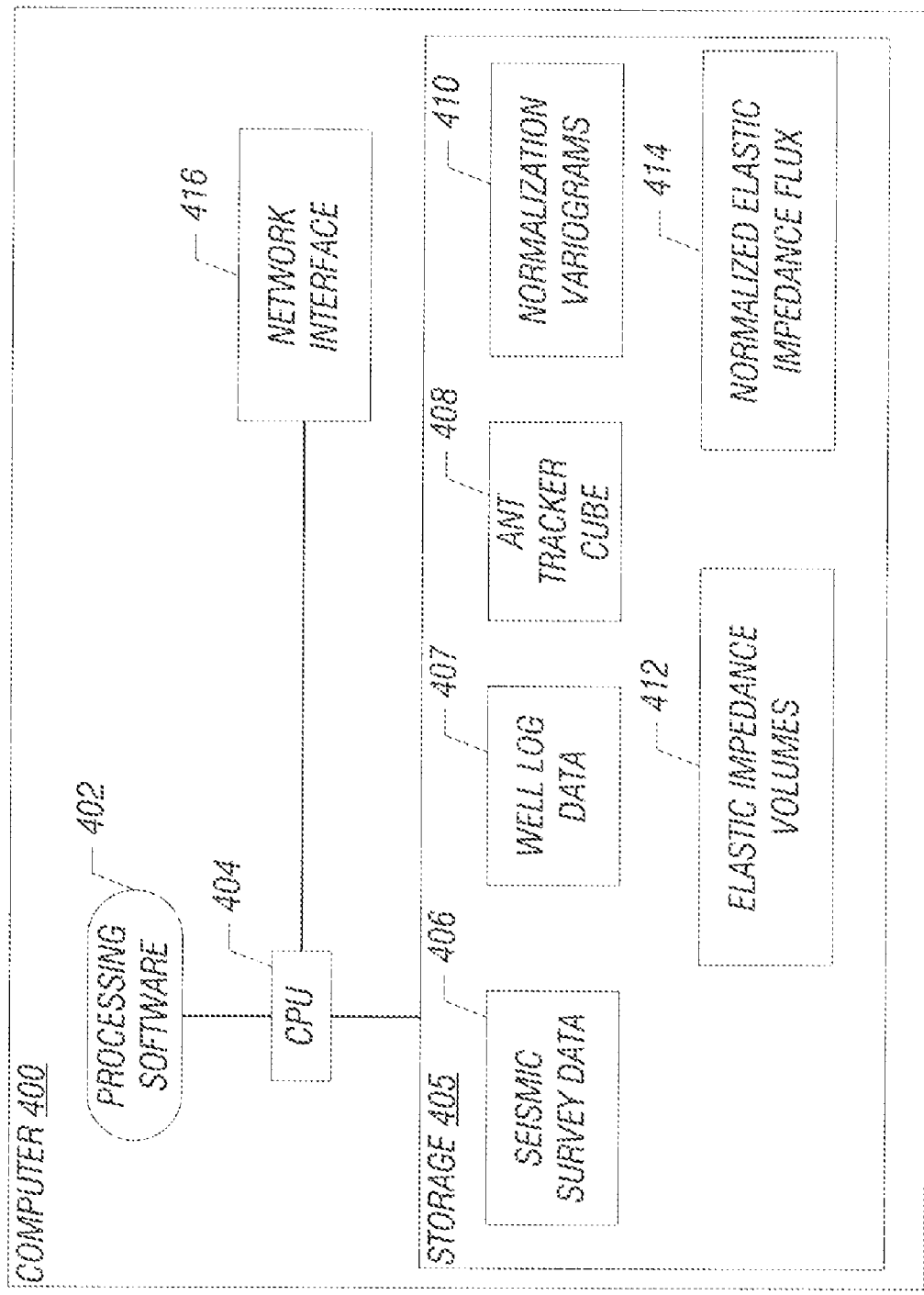
FIG. 4 is a block diagram of an example computer that incorporates processing software according to some embodiments.

FIG. 4 shows an example computer 400 that includes processing software 402 executable on one or more central processing units (CPUs) 404. The processing software 402 is used for performing various tasks discussed above, including, for example, the ant-tracking algorithm (102 in FIG. 1), identifying aligned fault populations (108), calculating elastic normalization variograms (110), AVO inversion to generate elastic inversion volumes (106), calculating normalized elastic inversion flux parameters (112), creating the geocellular model (114), and other tasks.

The one or more CPUs is (are) connected to a storage, which can store data such as seismic survey data 406, well log data 407, an ant-tracker cube 408, normalization variograms 410, elastic impedance volumes 412, and normalized elastic impedance flux values 414.

The computer 400 can also include a network interface 416 to allow the computer 400 to communicate (receive or transmit) the various data stored in the storage 405 with an external network entity.

Instructions of the processing software 402 are loaded for execution on a processor (such as the one or more CPUs 404). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining fault transmissivity in a subterranean reservoir, comprising:
   identifying fault structures in the subterranean reservoir;
   computing, by a computer, elastic impedance data from well log data and seismic data;

computing, by the computer, normalization parameters that have a predetermined orientation with respect to the identified fault structures;

determining, by the computer, elastic impedance flux values from the elastic impedance data; and normalizing, by the computer, the elastic impedance flux values with respect to the normalization parameters, wherein the normalized elastic impedance flux values are indicative of transmissivities of the fault structures in the subterranean reservoir.

2. The method of claim 1, wherein identifying the fault structures in the subterranean reservoir comprises using an ant-tracking algorithm to identify the fault structures.

3. The method of claim 1, wherein computing the elastic impedance data comprises performing inversion of seismic data to generate the elastic impedance data.

4. The method of claim 1, wherein computing the normalization parameters comprises computing elastic normalization variograms.

5. The method of claim 4, wherein computing the elastic normalization variograms comprises computing elastic normalization variograms for multiple offsets between seismic samples.

6. The method of claim 4, wherein computing the elastic normalization variograms comprises computing the elastic normalization variograms perpendicular to orientations of the fault structures.

7. The method of claim 6, wherein normalizing the elastic impedance flux values with respect to the normalization variograms removes effects of at least one of fault throw, compaction, and poor seismic imaging caused by fault smear.

8. The method of claim 1, further comprising creating a geocellular model having cells that are populated with the normalized elastic impedance flux values.

9. The method of claim 8, wherein the cells of the geocellular model can have arbitrary shapes.

10. The method of claim 1, further comprising aggregating the normalized elastic impedance flux values across fault structures.

11. The method of claim 10, wherein aggregating the normalized elastic impedance flux values comprises averaging the normalized elastic impedance flux values.

12. The method of claim 1, further comprising posting the normalized elastic impedance flux values onto fault structures in an image for visual interpretation.

13. The method of claim 1, wherein a relatively high normalized elastic impedance flux value is indicative of a barrier to fluid flow in the subterranean reservoir, and wherein a relatively low normalized elastic impedance flux value is indicative of a conduit for fluid flow in the subterranean reservoir.

14. The method of claim 1, wherein determining the elastic impedance flux values comprises determining flux values of one of acoustic impedances, shear wave impedances, densities, $V_p/V_s$, values, and Poisson's ratio values.

15. An article comprising at least one non-transitory computer-readable storage medium containing instructions that when executed cause a computer to:

identify fault structures in a subterranean reservoir using an automated tool;

compute elastic impedance data from well log data and seismic data;

compute normalized flux values based on the identified fault structures and the computed elastic impedance data, wherein the normalized elastic impedance flux values are indicative of transmissivities of the fault structures in the subterranean structure.

16. The article of claim 15, wherein the instructions when executed cause the computer to further:

create a geocellular model having a plurality of cells that represent a structural framework of the subterranean reservoir, wherein the cells of the geocellular model are populated with the normalized elastic impedance flux values.

17. The article of claim 15, wherein the instructions when executed cause the computer to further:

compute normalization variograms that have a predetermined orientation with respect to the identified fault structures, and wherein computing the normalized elastic impedance flux values is based on the normalization variograms.

18. A computer comprising:

a storage to store seismic data and well log data; and at least one processor to:

identify fault structures in a subterranean reservoir based on the seismic data;

compute elastic impedance data from the well log data and the seismic data;

compute normalization parameters that have a predetermined orientation with respect to the identified fault structures;

determine elastic impedance flux values from the elastic impedance data; and normalize the elastic impedance flux values with respect to the normalization parameters, where the normalized elastic impedance flux values are indicative of transmissivities of the fault structures in the subterranean reservoir.

19. The computer of claim 18, wherein a relatively high normalized elastic impedance flux value is indicative of a barrier to fluid flow in the subterranean reservoir, and wherein a relatively low normalized elastic impedance flux value is indicative of a conduit for fluid flow in the subterranean reservoir.

20. The computer of claim 18, wherein the normalization parameters comprise normalization variograms that are perpendicular to orientations of the fault structures.

* * * * *